United States Patent
Kang et al.

(10) Patent No.: US 9,769,869 B2
(45) Date of Patent: Sep. 19, 2017

(54) NON-CONTACT TYPE POWER SUPPLY APPARATUS AND NON-CONTACT TYPE POWER SUPPLY METHOD

(71) Applicant: SAMSUNG ELECTRO-MECHANICS CO., LTD., Suwon-Si (KR)

(72) Inventors: Chang Soo Kang, Suwon-Si (KR); Hee Sun Han, Suwon-Si (KR); Ji Hoon Kim, Suwon-si (KR); Hyun Keun Lim, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 427 days.

(21) Appl. No.: 14/536,431

(22) Filed: Nov. 7, 2014

(65) Prior Publication Data

US 2015/0133056 A1    May 14, 2015

(30) Foreign Application Priority Data

Nov. 11, 2013 (KR) .................. 10-2013-0136571
Jun. 10, 2014 (KR) .................. 10-2014-0070058

(51) Int. Cl.
*H02J 5/00* (2016.01)
*H02J 7/02* (2016.01)
(Continued)

(52) U.S. Cl.
CPC ............. *H04W 76/04* (2013.01); *H02J 17/00* (2013.01); *H02J 50/10* (2016.02); *H02J 50/80* (2016.02); *H04W 4/008* (2013.01)

(58) Field of Classification Search
CPC ....... H04W 76/04; H04W 4/008; H02J 50/10; H02J 50/80; H02J 17/00
See application file for complete search history.

(56) References Cited

U.S. PATENT DOCUMENTS

2009/0140690 A1    6/2009    Jung
2009/0284369 A1*   11/2009   Toncich .............. G06K 7/0008
                                                              340/539.3
(Continued)

FOREIGN PATENT DOCUMENTS

EP    2 731 231 A2    5/2014
EP    2 800 234 A2    11/2014
(Continued)

OTHER PUBLICATIONS

Korean Office Action issued on Jan. 5, 2016 in counterpart Korean Application No. 10-2014-0070058 (11 pages in Korean with English translation).

(Continued)

*Primary Examiner* — Daniel Cavallari
*Assistant Examiner* — Rafael Pacheco
(74) *Attorney, Agent, or Firm* — NSIP Law

(57) ABSTRACT

A non-contact type power supply apparatus may include a power unit transmitting power to a power receiving apparatus in a non-contact type manner, a communicating unit communicating with the power receiving apparatus, and a controlling unit terminating communications with the power receiving apparatus in the case in which a communications signal level of the power receiving apparatus transmitted to the communicating unit is equal to or less than a reference signal level.

17 Claims, 4 Drawing Sheets

(51) Int. Cl.
*H02J 17/00* (2006.01)
*H04W 76/04* (2009.01)
*H04W 4/00* (2009.01)
*H02J 50/10* (2016.01)
*H02J 50/80* (2016.01)

(56) References Cited

U.S. PATENT DOCUMENTS

| | | |
|---|---|---|
| 2012/0299389 A1 | 11/2012 | Lee et al. |
| 2013/0099586 A1 | 4/2013 | Kato |
| 2013/0154387 A1* | 6/2013 | Lee .................... H02J 17/00 307/104 |
| 2013/0154558 A1 | 6/2013 | Lee et al. |
| 2013/0214735 A1 | 8/2013 | Kang et al. |
| 2013/0241293 A1* | 9/2013 | Yamaguchi ............ H02J 4/00 307/66 |
| 2013/0257364 A1 | 10/2013 | Redding |
| 2016/0100312 A1* | 4/2016 | Bell .................... H02J 50/20 455/411 |

FOREIGN PATENT DOCUMENTS

| | | |
|---|---|---|
| JP | 2013-90483 A | 5/2013 |
| KR | 10-2009-0056546 | 6/2009 |
| KR | 10-2011-0009227 | 1/2011 |
| KR | 10-2012-0132225 A | 12/2012 |
| KR | 10-2013-0006363 | 1/2013 |
| KR | 10-2013-0069346 A | 6/2013 |
| WO | 2009/140217 A2 | 11/2009 |

OTHER PUBLICATIONS

Extended European Search Report dated Mar. 3, 2015 for European Patent Application No. 14275229.4.

* cited by examiner

NON-CONTACT TYPE POWER SUPPLY APPARATUS AND NON-CONTACT TYPE POWER SUPPLY METHOD

CROSS-REFERENCE TO RELATED APPLICATIONS

This application claims the benefit of Korean Patent Application Nos. 10-2013-0136571, filed on Nov. 11, 2013, and 10-2014-0070058, filed on Jun. 10, 2014, with the Korean Intellectual Property Office, the disclosures of which are incorporated in their entireties herein by reference.

BACKGROUND

The present disclosure generally relates to a non-contact, contactless or wireless type power supply apparatus and a power supply method of supplying power in a non-contact, contactless or wireless type manner.

In order to supply power from the outside of an electronic device, a power supply apparatus can transfer power from external power supplying equipment to the electronic device.

A wired-type power supply apparatus directly connected to the electronic device through a connector, or the like, may supply power to a battery embedded in the electronic device. Alternatively, power may be supplied to the battery embedded in the electronic device in a non-contact type manner by, for example, but not limited to, a magnetic induction effect or a magnetic resonance effect.

A non-contact type power supply apparatus may transmit a short beacon to detect an adjacent power receiving apparatus, and transmit a long beacon to wake up a Bluetooth circuit of the power receiving apparatus and then communicate with the Bluetooth circuit of the power receiving apparatus.

However, there may be a cross connection state in which a plurality of power receiving apparatuses are in a chargeable region, or a power receiving apparatus which is being charged receives power from another power transmitting apparatus in a non-contact type manner.

RELATED ART DOCUMENT (Patent Document 1) Korean Patent Laid-Open Publication No. 10-2011-0009227

SUMMARY

Some exemplary embodiments in the present disclosure may provide a non-contact type power supply apparatus and a non-contact type power supply method capable of controlling power transmission by selectively maintaining or terminating connections with a power receiving apparatus according to the received signal strength indication (RSSI) of an advertisement of the power receiving apparatus.

According to an exemplary embodiment in the present disclosure, a non-contact type power supply apparatus may include: a power unit transmitting power to a power receiving apparatus in a non-contact type manner; a communicating unit communicating with the power receiving apparatus; and a controlling unit cutting communications with the power receiving apparatus in the case in which a communications signal level of the power receiving apparatus transmitted to the communicating unit is equal to or less than a reference signal level. According to an exemplary embodiment in the present disclosure, a non-contact power supply method may include: requesting a connection to a power receiving apparatus; receiving an advertisement from the power receiving apparatus in response to the requested connection; and determining a termination of the connection with the power receiving apparatus by comparing a signal level of the received advertisement and a reference signal level.

The communications signal level may have a level equal to a level of an advertisement signal from a corresponding power receiving apparatus, which is a response to a connection request signal of the communicating unit. Power transmission to the power receiving apparatus in which the communications are stopped (or the connection is terminated) may be stopped.

Advertisement signals may be received from a plurality of power receiving apparatuses and the power transmission may be controlled in order of high to low signal levels among the power receiving apparatuses having a signal level of the received advertisement signal, which is equal to or greater than the level of the reference signal.

Whether or not the communications signal level of the power receiving apparatus is equal to or less than the level of the reference signal may be repeatedly detected. A short beacon may be transmitted to detect proximity of the power receiving apparatus. Along beacon may be transmitted to wake up a Bluetooth circuit of the power receiving apparatus.

BRIEF DESCRIPTION OF THE DRAWINGS

The above and other aspects, features and other advantages in the present disclosure will be more clearly understood from the following detailed description taken in conjunction with the accompanying drawings, in which.

DETAILED DESCRIPTION

Figure 1:
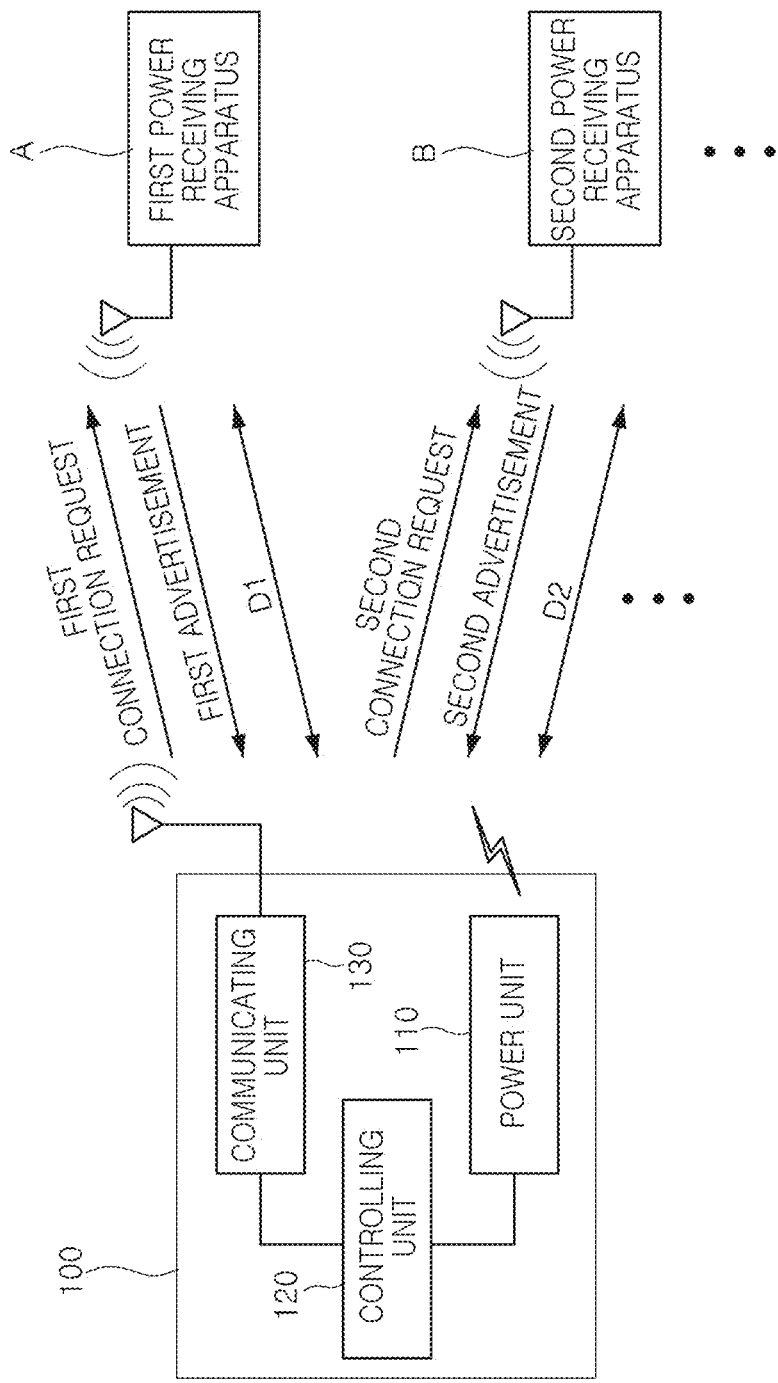
FIG. 1 is a view illustrating a schematic block diagram of a non-contact type power supply apparatus and a plurality of power receiving apparatuses receiving power from the non-contact type power supply apparatus according to an exemplary embodiment in the present disclosure.

Hereinafter, embodiments in the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

FIG. 1 is a view illustrating a schematic block diagram of a non-contact type power supply apparatus and a plurality of power receiving apparatuses receiving power from the non-contact type power supply apparatus according to an exemplary embodiment in the present disclosure.

Referring to FIG. 1, a non-contact type power supply apparatus 100 according to an exemplary embodiment in the present disclosure may include a power unit 110, a controlling unit 120, and a communicating unit 130.

The power unit 110 may transmit power to one or both of power receiving apparatuses A and B in a non-contact type manner according to a control of the controlling unit 120.

The non-contact type manner may refer to, for example, but not limited to, a method of transmitting the power without being electrically or wireley connected to the power receiving apparatus and be any power transmitting methods, which are variously named, such as a wireless power transmitting method, a contactless method, and the like.

The controlling unit 120 may control the power transmission of the power unit 110 and communications of the communicating unit 130.

The communicating unit 130 may perform wireless communication such as Bluetooth low energy (BLE) communications with one or both of the power receiving apparatuses A and B.

The controlling unit 120 may control the power unit 110 to broadcast or transmit a short beacon, thereby detecting one or more adjacent power receiving apparatuses.

In addition, the controlling unit 120 may broadcast or transmit a long beacon to wake up the detected power receiving apparatus A or B, such as, the Bluetooth circuit included in the power receiving apparatus, thereby, for example, allowing Bluetooth low energy communications between the communicating unit 130 and the power receiving apparatus A or B to be performed.

For instance, the communicating unit 130 may transmit a connection request signal to one or both of the power receiving apparatuses A and B and may be connected to the corresponding power receiving apparatus(es) A and/or B in response to an advertisement signal from the power receiving apparatuses A and/or B to perform the Bluetooth low energy communications.

In addition, the controlling unit 120 may control the power unit 110 to transmit the power to the corresponding power receiving apparatus(es) A and/or B in the non-contact type manner.

A plurality of power receiving apparatuses A and B may be adjacent to the non-contact type power supply apparatus 100, and the communicating unit 130 may transmit first and second connection request signals to the plurality of power receiving apparatuses A and B according to the control of the controlling unit 120 and receive first and second advertisement signals from the power receiving apparatuses A and B.

In this case, the controlling unit 120 may estimate or calculate distances D1 and D2 of the first power receiving apparatus A and the second power receiving apparatus B, respectively, based on levels of the first and second advertisement signals received by the communicating unit 130.

The levels of the received first and second advertisement signals may be, for example, but not limited to, received signal strength indications (RSSIs) of the advertisement signals.

In the case in which the RSSI of the advertisement signal of one power receiving apparatus of the first power receiving apparatus A and the second power receiving apparatus B is equal to or greater than a reference signal level, the non-contact type power supply apparatus 100 may recognize that only the corresponding power receiving apparatus is present in a charging region of the non-contact type power supply apparatus 100 and transmit power required by the corresponding power receiving apparatus in the non-contact type manner.

In the case in which RSSIs of the advertisement signals of the first power receiving apparatus A, the second power receiving apparatus B or other power receiving apparatuses are equal to or greater than the reference signal level, the non-contact type power supply apparatus 100 may estimate or calculate distances from the respective power receiving apparatuses based on the RSSIs of the received advertisement signals, and transmit the required power in order from a power receiving apparatus estimated as one which is present at the closest distance to a power receiving apparatus estimated as one which is present at the farthest distance.

Figure 2:
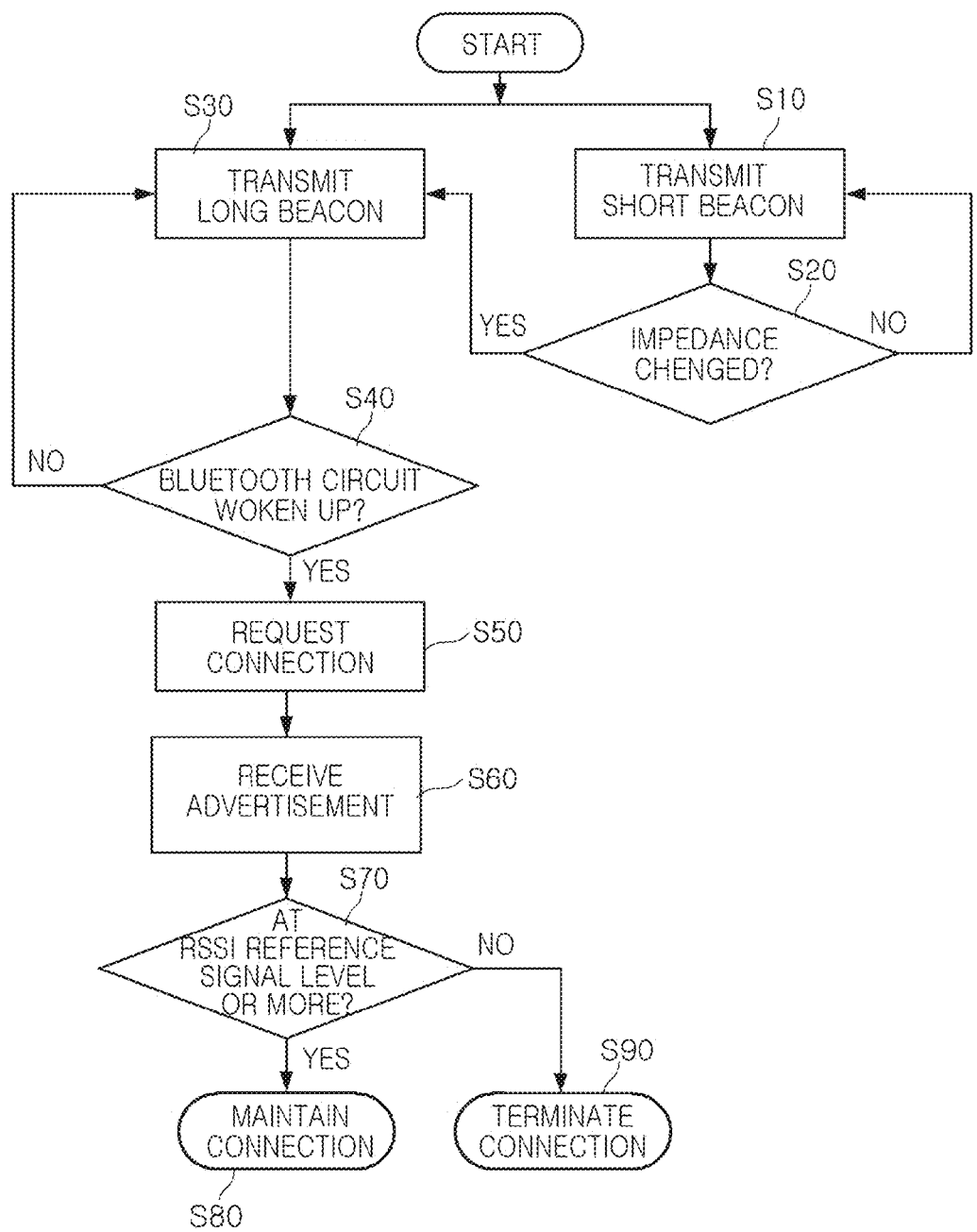
FIG. 2 is a flowchart schematically illustrating a non-contact type power supply method according to an exemplary embodiment in the present disclosure.

FIG. 2 is a flowchart schematically illustrating a non-contact type power supply method according to an exemplary embodiment in the present disclosure.

Referring to FIGS. 1 and 2, the power unit 110 may broadcast a short beacon having a preset period according to a control of the controlling unit 120 to detect one or more power receiving apparatuses adjacent to the power supply apparatus 100.

The power unit 110 may transmit a short beacon to detect one or more power receiving apparatuses adjacent to the non-contact power supply apparatus 100 (S10). For example, whether or not there are one or more power receiving apparatuses adjacent to the power supply apparatus 100 may be determined by detecting an impedance change in a receiving coil (not shown) employed in the power unit 110 (S20). In the case in which the impedance change in the receiving coil is greater than a reference level, it may be recognized that the power receiving apparatus is adjacent (S10, S20).

In addition, the power unit 110 may broadcast or transmit a long beacon having a period which may be set differently from the period of the short beacon, according to the control of the controlling unit 120 to wake up one or more adjacent power receiving apparatuses, such as, a Bluetooth circuit included in the power receiving apparatus (S30, S40).

Next, the communicating unit 130 may transmit a connection request signal to the power receiving apparatus, in which the Bluetooth circuit is waked up, according to the control of the controlling unit 120 (S50) and receive an advertisement signal from the corresponding power receiving apparatus (S60).

In the case in which the RSSI of the advertisement signal transmitted to the communicating unit 130 is greater than a preset reference signal (S70), the controlling unit 120 may maintain a connection with the corresponding power receiving apparatus and transmit power to the corresponding power receiving apparatus in the non-contact type manner (S80).

On the contrary, in the case in which the RSSI of the advertisement signal transmitted to the communicating unit 130 is equal to or less than the preset level of the reference signal, the controlling unit 120 may terminate the connection with the corresponding power receiving apparatus (S90).

Figure 3A:
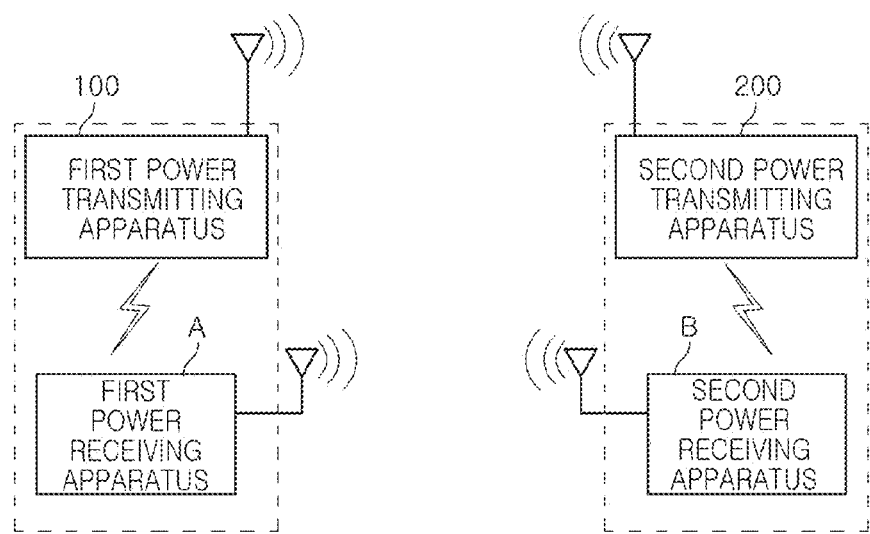
FIGS. 3A and 3B are views illustrating a connection and across connection between a plurality of non-contact type power supply apparatuses and a plurality of power receiving apparatuses according to another exemplary embodiment in the present disclosure.
Figure 3B:
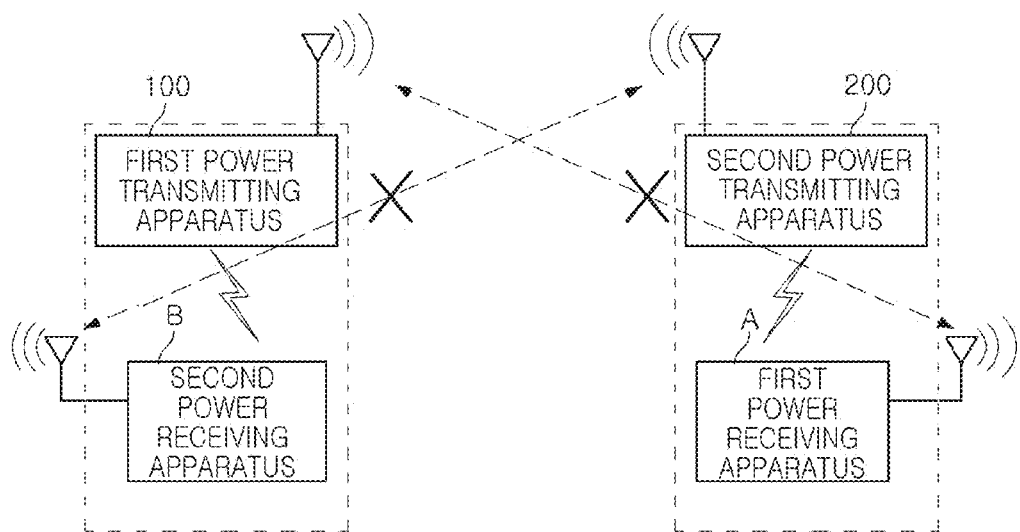

FIGS. 3A and 3B are views illustrating a connection and a cross connection between a plurality of non-contact type power supply apparatuses and a plurality of power receiving apparatuses according to an exemplary embodiment in the present disclosure.

Referring to FIG. 3A, as an exemplary embodiment in the present disclosure, there may be a plurality of non-contact type power supply apparatuses (first and second power transmitting apparatuses) 100 and 200, and the first and second power transmitting apparatuses 100 and 200 may supply power to first and second power receiving apparatuses A and B, respectively, in a non-contact type manner.

Meanwhile, a cross connection state in which a power receiving apparatus, which is being charged by one power transmitting apparatus, receives the power from another power transmitting apparatus in the non-contact type manner may occur.

Referring to FIG. 3B, when the first power receiving apparatus A may be located in a charging region of the second power transmitting apparatus 200 while receiving the power from the first power transmitting apparatus 100 in the non-contact type manner, the first power receiving apparatus A may receive the power from the second power transmitting apparatus 200 in the non-contact type manner.

Similarly, when the second power receiving apparatus B may be located in a charging region of the first power transmitting apparatus 100 while receiving the power from the second power transmitting apparatus 200 in the non-contact type manner, the second power receiving apparatus B may receive the power from the first power transmitting apparatus 100 in the non-contact type manner.

In the case in which the above-mentioned cross connection state occurs, the first and second power transmitting apparatuses 100 and 200 need to further transmit power to each of the second and first power receiving apparatuses B and A in the non-contact type manner, in addition to power transmitted to the first and second power receiving apparatuses A and B in the existing non-contact type manner.

However, since the first power receiving apparatus A is out of the charging region of the first power transmitting apparatus 100 and the second receiving apparatus B is out of the charging region of the second power transmitting apparatus 200, even in the case in which the first and second power receiving apparatuses A and B increase transmission power, the power of the first power transmitting apparatus 100 may be not transmitted to the first power receiving apparatus A and the power of the second power transmitting apparatus 200 may be not transmitted to the second power receiving apparatus B, resulting in a power waste.

As a result, the first power transmitting apparatus 100 may stop the BLE communications with the first power receiving apparatus A and may stop the power transmission to the first power receiving apparatus A.

Similarly, the second power transmitting apparatus 200 may stop the BLE communications with the second power receiving apparatus B and may stop the power transmission to the second power receiving apparatus B.

The above-mentioned communications stop may be performed by determining whether or not the RSSI of an advertisement signal from the corresponding power receiving apparatus is equal to or greater than the predetermined level of the reference signal.

Figure 4:
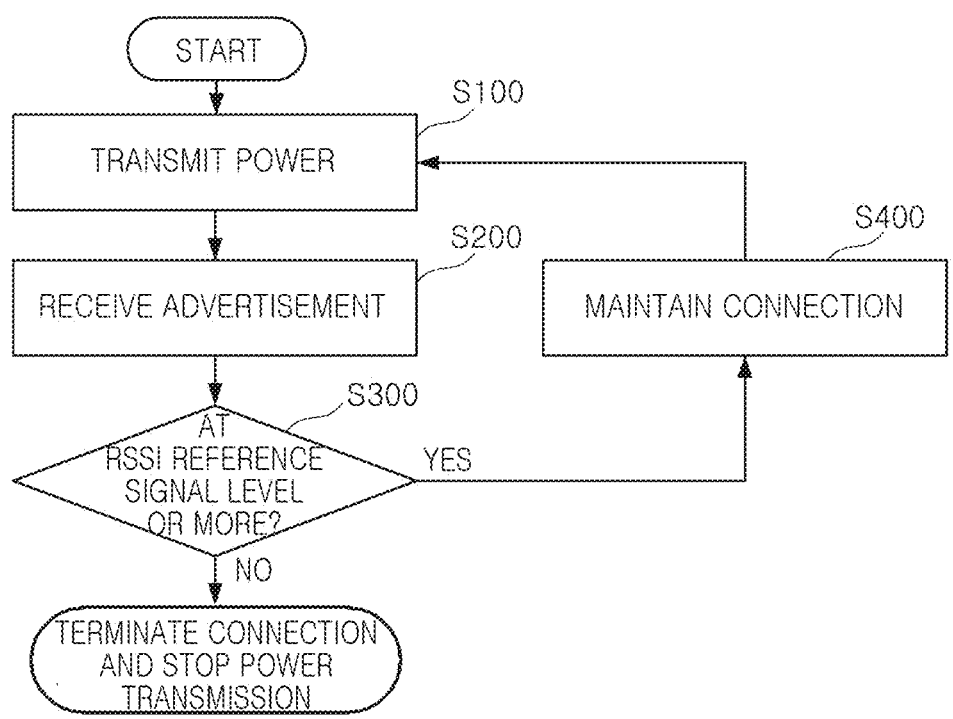
FIG. 4 is a flowchart schematically illustrating a non-contact type power supply method according to an exemplary embodiment in the present disclosure.

FIG. 4 is a flowchart schematically illustrating a non-contact type power supply method according to an exemplary embodiment in the present disclosure.

As illustrated in FIG. 3B, for example, the first power transmitting apparatus 100 may repeatedly receive the advertisement signal from the first power receiving apparatus A (S200) while transmitting the power in the non-contact type manner (S100. The first power transmitting apparatus 100 may terminate the BLE communications connection and stop the power transmission in the case in which the RSSI of the received advertisement signal is equal to or less than the present level of the reference signal (S300).

As a result, in the case in which the cross connection state occurs during the power transmission, the first power transmitting apparatus 100 may terminate the BLE communications connection, thereby preventing the power waste.

On the other hand, in the case in which the RSSI of the received advertisement signal is equal to or greater than the predetermined level of the reference signal, the first power transmitting apparatus 100 may maintain the BLE communications connection with the first power receiving apparatus A and may maintain the power transmission to the first power receiving apparatus A (S400).

Since the above-mentioned operations may be performed in the same way even in the second power transmitting apparatus 200 illustrated in FIG. 3B, a detailed description for the second power transmitting apparatus 200 will be omitted.

As described above, according to some exemplary embodiments in the present disclosure, an unnecessary power waste may be prevented by selectively maintaining or terminating the BLE communications connection with one or more power receiving apparatuses A and B according to advertisement RSSI received from the power receiving apparatus to control the power transmission. The power transmission may be efficiently performed by transmitting the required power to the plurality of the power receiving apparatuses A and B in the charging region(s) of the first and/or second power transmitting apparatuses 100 and/or 200.

As set forth above, according to some exemplary embodiments in the present disclosure, the power transmission may be controlled by maintaining or terminating the connection with the power receiving apparatus A or B according to the received signal strength indication (RSSI) of an advertisement of the power receiving apparatus A or B.

While exemplary embodiments have been shown and described above, it will be apparent to those skilled in the art that modifications and variations could be made without departing from the scope of the invention as defined by the appended claims.

What is claimed is:

1. A non-contact type power supply apparatus comprising:
    a power unit configured to contactlessly transmit power to one or more power receiving apparatuses;
    a communicating unit configured to communicate with the one or more power receiving apparatuses; and
    a controlling unit configured to:
        terminate communications with the one or more power receiving apparatuses in response to a communications signal level of the one or more power receiving apparatuses transmitted to the communicating unit being equal to or less than a reference signal level,
        calculate distances from the one or more power receiving apparatuses to the non-contact type power supply apparatus based on the communication signal level, and
        control transmitting the power in an order from a power receiving apparatus estimated as being at a closest distance to a power receiving apparatus estimated as being at a farthest distance.

2. The non-contact type power supply apparatus of claim 1, wherein the controlling unit is configured to stop transmitting the power to the one or more power receiving apparatuses in response to the communications being terminated.

3. The non-contact type power supply apparatus of claim 1, wherein the controlling unit is configured to stop the communications with one or more of the power receiving apparatuses having a communications signal level equal to or less than the reference signal level.

4. The non-contact type power supply apparatus of claim 1, wherein the communications signal level is a level of an advertisement signal transmitted from the one or more power receiving apparatuses in response to a connection request signal of the communicating unit.

5. The non-contact type power supply apparatus of claim 4, wherein the level of the advertisement signal is a received signal strength indication (RSSI) of the advertisement signal.

6. The non-contact type power supply apparatus of claim 1, wherein the power unit is configured to transmit a short beacon to detect a proximity of the one or more power receiving apparatuses.

7. The non-contact type power supply apparatus of claim 1, wherein the power unit is configured to transmit a long beacon to wake up a Bluetooth circuit comprised in each of the one or more power receiving apparatuses.

8. The non-contact type power supply apparatus of claim 1, wherein the communicating unit is configured to perform Bluetooth low energy (BLE) communications with a Bluetooth circuit comprised in a corresponding power receiving apparatus among the one or more power receiving apparatuses.

9. The non-contact type power supply apparatus of claim 1, wherein the controlling unit is configured to repeatedly detect the one or more power receiving apparatuses having the communications signal level which is equal to or less than the reference signal level.

10. The non-contact type power supply apparatus of claim 3, wherein the controlling unit is configured to control power transmission to the power receiving apparatuses in order of high to low communication signal levels.

11. A power supply method of transmitting power in a non-contact type manner, the power supply method comprising:
   requesting a connection to one or more power receiving apparatuses;
   receiving an advertisement from the one or more power receiving apparatuses in response to the requested connection;
   determining a termination of the connection with the one or more power receiving apparatuses by comparing a signal level of the received advertisement and a reference signal level;
   terminating the connection with the one or more power receiving apparatuses in response to the signal level of the received advertisement being equal to or less than the reference signal level;
   calculating distances from the one or more power receiving apparatuses to the non-contact type power supply apparatus based on the signal level of the received advertisement; and
   controlling transmission of the power in an order from a power receiving apparatus estimated as being at a closest distance to a power receiving apparatus estimated as being at a farthest distance.

12. The non-contact type power supply method of claim 11, further comprising transmitting a short beacon to detect proximity of the one or more power receiving apparatuses.

13. The non-contact type power supply method of claim 11, further comprising transmitting a long beacon to wake up a Bluetooth circuit comprised in each of the one or more power receiving apparatuses.

14. The non-contact type power supply method of claim 11, further comprising transmitting power to the connected one or more power receiving apparatus.

15. The non-contact type power supply method of claim 11, further comprising transmitting power in order of high to low signal levels among the power receiving apparatuses having the signal level, which is equal to or greater than the reference signal level, and sending advertisements.

16. The non-contact type power supply method of claim 11, wherein in the determining of the termination of the connection, an advertisement signal is repeatedly received from the power receiving apparatuses and a level of the advertisement signal is compared to the reference signal level.

17. The non-contact type power supply method of claim 11, wherein the signal level of the advertisement is a received signal strength indication (RSSI) of an advertisement signal.

* * * * *